United States Patent
Ma et al.

(10) Patent No.: US 8,130,851 B2
(45) Date of Patent: Mar. 6, 2012

(54) BANDWIDTH EFFICIENT CODING FOR AN ORTHOGONAL FREQUENCY MULTIPLEXING OFDM SYSTEM

(75) Inventors: Chuanhui Ma, Princeton, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 711 days.

(21) Appl. No.: 12/236,840

(22) Filed: Sep. 24, 2008

(65) Prior Publication Data

US 2009/0080551 A1 Mar. 26, 2009

Related U.S. Application Data

(60) Provisional application No. 60/975,336, filed on Sep. 26, 2007.

(51) Int. Cl.
*H04B 15/00* (2006.01)
*H04K 1/02* (2006.01)
*H04L 25/03* (2006.01)
*H04L 25/49* (2006.01)

(52) U.S. Cl. .................. 375/260; 375/285; 375/296

(58) Field of Classification Search .................. 375/146, 375/275, 296, 299, E7.258, 295, 297, 285; 370/480, 482, 208

See application file for complete search history.

(56) References Cited

U.S. PATENT DOCUMENTS

| 2002/0114270 A1* | 8/2002 | Pierzga et al. | 370/208 |
| 2006/0120473 A1* | 6/2006 | Baum | 375/260 |
| 2007/0189151 A1* | 8/2007 | Pan et al. | 370/210 |
| 2007/0217485 A1* | 9/2007 | Kawasaki | 375/146 |

OTHER PUBLICATIONS

Sathananthan, "New ICI Reduction Schemes for OFDM System", Oct. 2001, Vehicular Technology Conference, 2001.VTC 2001 Fall. IEEE VTS 54th, 2, pp. 834-838.*
Sathananthan et al., New ICI Reduction schemes for OFDM System, 2001, IEEE, Vehicular Technology Conference.*

* cited by examiner

*Primary Examiner* — Dac V. Ha
*Assistant Examiner* — Wednel Cadeau
(74) *Attorney, Agent, or Firm* — Joseph Kolodka

(57) ABSTRACT

A method for encoding an OFDM signal includes pairing two adjacent subcarriers of an OFDM signal as a group, changing a modulated symbol set of the OFDM signal to a modified symbol set for coding the OFDM signal, and providing a modified baseband OFDM signal with an increased frequency separation between the subcarriers and reducing the total number of subcarriers being used for transmission over each OFDM symbol interval.

7 Claims, 1 Drawing Sheet

BANDWIDTH EFFICIENT CODING FOR AN ORTHOGONAL FREQUENCY MULTIPLEXING OFDM SYSTEM

This application claims the benefit of U.S. Provisional Application No. 60/975,336, entitled "Novel Bandwidth Efficient Coded OFDM System for ICI and PAPR Reduction", filed on Sep. 26, 2007, the contents of which is incorporated by reference herein.

BACKGROUND OF THE INVENTION

The present invention relates generally to optical communications, and more particularly, to a bandwidth efficient coded OFDM system for inter-carrier interference and for reduction of peak-to-average-power ratio reduction.

BACKGROUND OF THE INVENTION

Orthogonal Frequency Division Multiplexing (OFDM) is a technique that provides high-data-rate communications, but it's sensitive to the carrier frequency offset (CFO) caused by the misalignment in carrier frequencies between transmitter and receiver, which results in inter-carrier interference (ICI) and degrades the performance. In this invention, we propose a novel bandwidth efficient coded OFDM system, which not only can reduce the ICI, but also can reduce the peak-to-average-power ration (PAPR) compared with some of the previous schemes.

Several techniques have been motivated to find solutions to reducing the ICI. Among these schemes, ICI self-cancellation and polynomial coded cancellation schemes have attracted a lot of attention due to their simplicity and high robustness against the ICI. In these techniques, each data symbol is transmitted on two adjacent sub-carriers with opposite polarity in order to reduce the ICI. However, the data throughput of these schemes is only half of that of conventional OFDM for all kinds of modulations. The rate ⅔ and ¾ coding schemes have been proposed to improve the data throughput with moderate ICI cancellation, but construction of such codes is extremely complicated. Another scheme is partial carrier filling (PCF), which assigns redundant zero values to certain OFDM sub-carriers to reduce the ICI. However, the data through out of this scheme is also only half of that of conventional OFDM.

Accordingly, there is a need for a novel bandwidth efficient coded OFDM to combat the ICI.

SUMMARY OF THE INVENTION

A method for encoding an OFDM signal includes pairing two adjacent subcarriers of an OFDM signal as a group, changing a modulated symbol set of the OFDM signal to a modified symbol set for coding the OFDM signal, and providing a modified baseband OFDM signal with an increased frequency separation between the subcarriers and reducing the total number of subcarriers being used for transmission over each OFDM symbol interval.

An encoder for encoding an OFDM signal includes pairing two adjacent sub-carriers of an OFDM signal as a group, and modifying a set of symbols of a modulated OFDM system to a set of modified symbols for an encoded OFDM system with each pair of symbols being jointly mapped to a corresponding pair of sub-carriers of the OFDM signal.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to an inventive bandwidth efficient coded OFDM method to combat inter-carrier interference ICI. It is known that the further the separation between sub-carriers, the less the ICI. Thus, the basic idea is to increase the frequency separation between adjacent sub-carriers. In order to realize this goal, first, we pair two adjacent sub-carriers as a group; then, jointly code the data information on them. After coding, only one of the two sub-carriers in that pair is used for transmission over each OFDM symbol interval, which implies that, in the inventive OFDM system, only half the number of sub-carriers is employed for transmission over each OFDM symbol interval so that the separation among sub-carriers is increased, which can lead to the ICI and the PAPR.

As noted above, after coding according to the invention in an OFDM system, only half number of sub-carriers is used for transmission over each OFDM symbol interval. By doing this, on the one hand, the proposed coded OFDM system can reduce the ICI; on the other hand, it also can improve the PAPR, the bandwidth efficiency and the power efficiency compared with the ICI self-cancellation scheme, polynomial coded cancellation. But, when compared with PCF scheme, only the bandwidth efficiency is improved.

Figure 1:
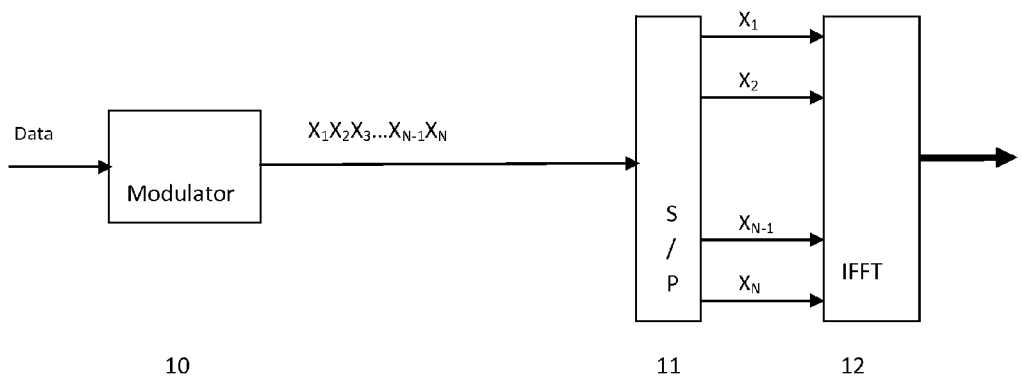
FIG. 1 is a block diagram of a conventional OFDM system.

A conventional OFDM system is shown in FIG. 1. A conventional modulator 10, responsive to incoming data, is configured so that each of its modulated symbol $X_k$ (k=1 ..., N) is selected from the set $\{\lambda_1, \lambda_2, \ldots \lambda_M\}$, which correspond to the signal points on different modulation constellations with M elements. The output of the modulator is directed to a serial-to-parallel converter 11. The parallel output from the serial-to-parallel converter 11 is directed to an inverse Fast Fourier transform (IFFT) circuit 12.

Figure 2:
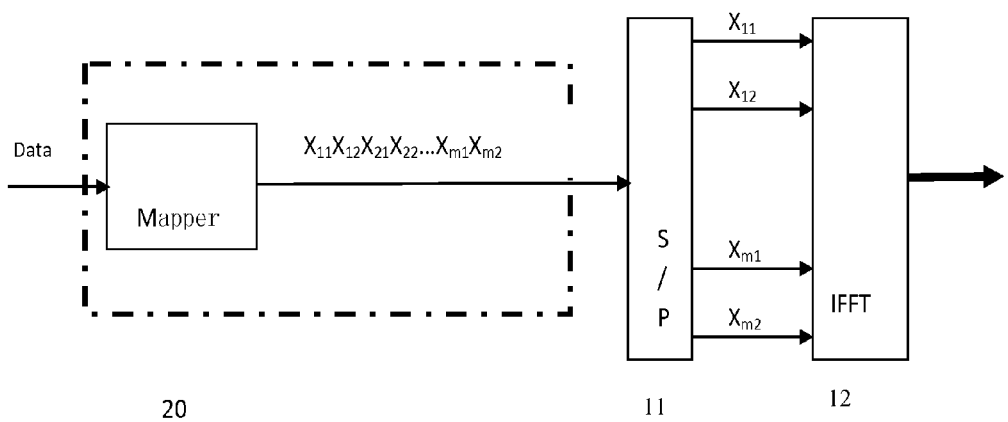
FIG. 2 is a block diagram for of an exemplary OFDM system employing an inventive mapper in accordance with the invention.

An OFDM system employing an inventive mapper is shown in FIG. 2. In this invention, we pair the two adjacent sub-carriers as a group and modify the set $\{\lambda_1, \lambda_2, \ldots, \lambda_M\}$ of conventional OFDM systems to the set $\{0, \lambda_1, \lambda_2, \ldots, \lambda_M\}$ for the proposed OFDM system. Each pair of symbol is jointly mapped to corresponding pair of sub-carriers. The pair of $\{X_{m1}, X_{m2}\}$ can be chosen from the following set:

$\{X_{m1}, X_{m2}\}$
$\in \{(0, \lambda_1), (0, \lambda_2), \ldots, (0, \lambda_M), (\lambda_1, 0), (\lambda_2, 0), \ldots, (\lambda_M, 0)\}$
where m (1, ..., N/2) is the total number of groups.

Figures 3, 4:
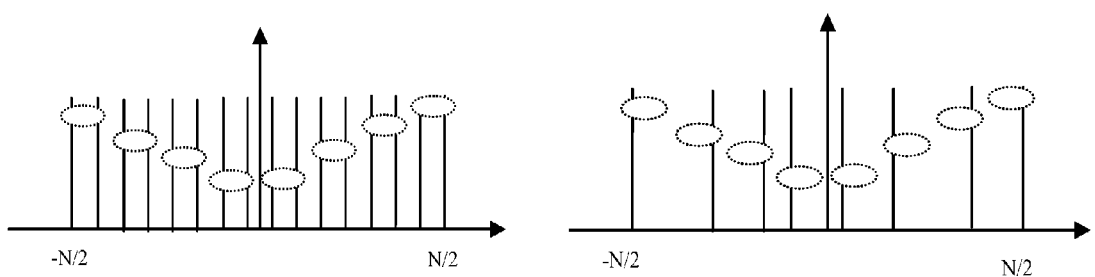
FIG. 3 shows a grouped OFDM symbol in accordance with the invention.
FIG. 4 shows an OFDM signal coded in accordance with the invention.

The basic idea for the inventive coding of the OFDM signal is to increase the frequency separation between sub-carriers and reduce the total number of sub-carriers being used for transmission over each OFDM symbol interval. In order to reach this goal, first, we pair the two adjacent sub-carriers as a group, which is shown in FIG. 3. Then, we need to redefine the set, from which each modulated symbol $X_k$ is chosen. We modify the set $\{\lambda_1, \lambda_2, \ldots, \lambda_M\}$ for a conventional OFDM system to the set $\{0, \lambda_1, \lambda_2, \ldots, \lambda_M\}$ for the proposed coded OFDM system. Zero in the modified set corresponds to the signal point at the origin. The modified complex baseband OFDM signal can be expressed as $$s(t) = \frac{1}{\sqrt{N}} \sum_{m=1}^{N/2} (X_{m1} e^{j2\pi(2m-1)\Delta ft} + X_{m2} e^{j2\pi(2m)\Delta ft})$$

$$0 \le t \le T$$

where m is the total number of groups.

In conventional OFDM systems, each modulated symbol $X_k$ is mapped to one of sub-carriers. However, in the proposed OFDM system, each pair of symbol is jointly mapped to that pair of sub-carriers. The pair of $\{X_{m1}, X_{m2}\}$ can be chosen from the following set:

$\{X_{m1}, X_{m2}\}$
$\in \{(0, \lambda_1), (0, \lambda_2), \ldots, (0, \lambda_M), (\lambda_1, 0), (\lambda_2, 0), \ldots, (\lambda_M, 0)\}$ We observe that, by choosing the pair of $\{X_{m1}, X_{m2}\}$ from the given set, only one of two sub-carriers in each pair is used for transmission over each OFDM symbol interval at all time, which means that frequency separation between sub-carriers is increased, so that the ICI can be reduced. At the same time, in each OFDM symbol interval, only half numbers of sub-carriers are being used for transmission, which potentially leads to the PAPR reduction and the power efficiency improvement compared with the schemes mentioned above. The coded OFDM symbol is shown in FIG. 4.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. A method for encoding an OFDM signal comprising the steps of:
    pairing two adjacent subcarriers of an OFDM signal as a group,
    changing a modulated symbol set of the OFDM signal to a modified set for coding the OFDM signal, and
    providing a modified baseband OFDM signal with an increased frequency separation between the subcarriers and reducing the total number of subcarriers being used for transmission over each OFDM symbol interval
    wherein the modified baseband OFDM signal comprises a pair of symbols being jointly mapped to a pair of sub-carriers and the pair of symbols $\{X_m, X_{m2}\}$ is chosen from the following set
    $\{X_m, X_{m2}\} \in \{(0, \lambda_1), (0, \lambda_2), \ldots, (0, \lambda_M), (\lambda_1, 0), (\lambda_2, 0), \ldots, (\lambda_M, 0)\}$;
    where m(1, ... N/2) is the total number of groups; and
    the step of changing comprises modifying the set of symbols $\{\lambda_1, \lambda_2, \ldots, \lambda_M\}$ according to a modulated OFDM signal to a set of modified symbols $\{0, \lambda_1, \lambda_2, \ldots, \lambda_M\}$ for a mapped OFDM signal; and
    the modified OFDM signal comprises only one of two sub-carriers in each pair being used for transmission over each OFDM symbol interval at all times thereby increasing frequency separation between sub-carriers compared to a conventional OFDM system.

2. The method of claim 1, wherein the step of providing comprises zeroing in the modified symbol set corresponding to the OFDM signal point at its origin.

3. The method of claim 1, wherein the modified OFDM signal comprises the following expression:

$$s(t) = \frac{1}{\sqrt{N}} \sum_{m=1}^{\frac{N}{2}} (X_{m1} e^{j2\pi(2m-1)\Delta ft} + X_{m2} e^{j2\pi(2m)\Delta ft}); \quad 0 \le t \le T$$

where m is the total number of groups, s(t) is the signal, and $X_{m1}$ and $X_{m2}$ is the signal pair.

4. The method of claim 1, wherein the modified OFDM signal comprises for each OFDM symbol interval only half the number of sub-carriers being used for transmission.

5. An encoder for encoding an OFDM signal, comprising:
    pairing two adjacent sub-carriers of an OFDM signal as a group, and
    modifying a set of symbols of a modulated OFDM system to a set of modified symbols for an encoded OFDM system with each pair of symbols being jointly mapped to a corresponding pair of sub-carriers of the OFDM signal;
    wherein the modified OFDM signal comprises a pair of symbols being jointly mapped to a pair of sub-carriers and the pair of symbols $\{X_m, X_{m2}\}$ is chosen from the following set
    $\{X_m, X_{m2}\} \in \{(0, \lambda_1), (0, \lambda_2), \ldots, (0, \lambda_M), (\lambda_1, 0), (\lambda_2, 0), \ldots, (\lambda_M, 0)\}$;
    where m(1, ... N/2) is the total number of groups; and
    the step of changing comprises modifying the set of symbols $\{\lambda_1, \lambda_2, \ldots, \lambda_M\}$ according to a modulated OFDM signal to a set of modified symbols $\{0, \lambda_1, \lambda_2, \ldots, \lambda_M\}$ for a mapped OFDM signal; and
    the modified OFDM signal comprises only one of two sub-carriers in each pair being used for transmission over each OFDM symbol interval at all times thereby increasing frequency separation between sub-carriers compared to a conventional OFDM system.

6. The encoder of claim 5, wherein the encoded OFDM signal comprises only one of two sub-carriers in each pair being used for transmission over each OFDM symbol interval at all times thereby increasing frequency separation between sub-carriers compared to a conventional OFDM system.

7. The encoder of claim 5, wherein the encoded OFDM signal comprises for each OFDM symbol interval only half the number of sub-carriers being used for transmission.

* * * * *